UNITED STATES PATENT OFFICE 2,365,438

MINERAL SUPPLEMENT

Theodore W. Schilb, Kirkwood, Mo., assignor to Monsanto Chemical Company, a corporation of Delaware No Drawing. Application July 3, 1942,
Serial No. 449,671

18 Claims. (Cl. 99—143)

This invention relates to a mineral food supplement and process of producing the same.

The addition of various single calcium phosphates to food products, has long been a desired practice in order to supply the necessary calcium and phosphorus elements to the diet. It has recently become desirable, in the interests of more complete assimilation to supply mixtures of certain hydrated orthophosphates of calcium, particularly the mono- and dicalcium orthophosphates. Ordinarily the addition of one or the other of these substances singly to food products presents little difficulty from the stability standpoint, however when the two products are added as a mixture or both added separately to food products of a farinaceous nature and particularly when added to freshly milled wheat flour at an elevated temperature and of high moisture content, the question of stability is of considerable importance.

It is desirable from the standpoint of ease and convenience of handling, and mixing that prepared mixtures of the mono- and the hydrated dicalcium orthophosphate be prepared and that one addition of the supplement be made to the food product. As a supplement to wheat flour especially the highly refined grades, it is preferred to add a mixture comprising 25 parts of monocalcium orthophosphate monohydrate, $$(CaH_4P_2O_8.H_2O)$$

or the corresponding anhydrous salt, and 75 parts of dicalcium orthophosphate dihydrate $$(CaHPO_4.2H_2O)$$

I have however found that a mixture of these two phosphates are quite unstable upon storage, the original finely divided free flowing powders of which these materials are composed rapidly becoming damp and gradually form a hard solid cake or block. I have further found that the lack of stability is due to the fact that the dicalcium phosphate dihydrate is the unstable constituent of the mixture and that it has a pronounced tendency to lose its water of hydration forming the anhydrous salt together with free water. Whether the free water thus liberated is liberated in the mixture of the two phosphates prior to admixture with flour, or after such admixture, the result is undesirable as in the first case severe caking results and in the second case the hydrated dicalcium orthophosphate becomes anhydrous thus becoming less soluble and less assimilable. Should the admixture be added to a self-rising flour the moisture thus liberated would cause premature reaction of the baking acid and the bicarbonate present in such flours.

I have now found that non-caking free-flowing powdery mixtures of the finely divided orthophosphates of calcium, of which mixture the dicalcium phosphate dihydrate is a constituent, can be prepared by employing a stabilized form of the dicalcium phosphate dihydrate in the mixture. It is accordingly not necessary to stabilize the monocalcium orthophosphate, even though this particular salt is employed in the form of its hydrate.

A stabilized form of dicalcium phosphate dihydrate can be formed by the addition of various salts or inhibitors or anti-caking agents in varying amounts to this material, the amounts of salts being relatively small, that is usually from a fraction of 1% to as much as 6 percent although more may be used. Usually the addition of the stabilizing salt is made by the admixture of the dry salts although in practice it is possible also to treat the dicalcium phosphate during the process of its manufacture with solutions of salts to impart stability, as hereinafter more particularly described.

My stable mixture of calcium phosphates is particularly adapted to serve as a distributing agent for vitamins where these substances are to be added to the diet.

The most desirable mixture of mono- and dicalcium phosphate from the standpoint of ready assimilation by the human organism are those having the composition:

| | Per cent by weight |
|---|---|
| $CaH_4P_2O_8.H_2O$ | 25 |
| $CaHPO_4.2H_2O$ | 75 |

For certain purposes this relationship may be modified and I contemplate mixtures of these compounds containing from say 15 to 40 parts of $CaH_4P_2O_8.H_2O$ together with 85 to 60 parts of $CaHPO_4.2H_2O$ although other modifications may advantageously be employed. To this mixture may be added the stabilizing agent or the latter may in some cases be added directly to the dicalcium phosphate ingredient in order first to form a stabilized compound which will withstand handling better than the ordinary unstabilized form of dicalcium phosphate and which later may be mixed with the monocalcium phosphate.

I have tested mixtures containing 25% monocalcium phosphate $(CaH_4P_2O_8.H_2O)$ or $$(CaH_4P_2O_8)$$

and 75% dicalcium phosphate $(CaHPO_4.2H_2O)$ in order to ascertain behavior upon storage by the following two procedures:

(a) The mixture after preparation is sealed in a closed container and stored at ordinary room temperatures. Samples of the product are withdrawn from the container at suitable intervals and a test made for free moisture, for total ignition loss and an observation made as to its mechanical condition, i. e., for its free flowing properties or as to how badly the mixture has "set" or caked.

(b) The mixture as made is placed in open dishes in an oven maintained at 60° C. From time to time the dish and contents are weighed and a loss in weight determined thereon.

As tested by these two methods my mixtures employing stabilized dicalcium phosphate dihydrate were found to be in excellent mechanical condition having lost substantially no moisture either upon storage at room temperature or at 60° C.

Satisfactory stabilizers or inhibitors of dehydration for my present product may be of the following compositions, the percentage being somewhat variable and as expressed below it is based upon the dicalcium phosphate dihydrate present in the mixture.

Satisfactory stabilizers or inhibitors of dehydration for my present product are the metal phosphates and preferably the alkali metal phosphates which have been molecularly dehydrated. Such molecularly dehydrated phosphates are obtained by dehydrating the corresponding orthophosphates to the extent that water of constitution is eliminated. Such dehydration is most conveniently carried out by the application of heat to the orthophosphate. The inhibitors therefore comprise the pyrophosphates and metaphosphates of the alkali metals, or mixtures thereof, of which the sodium and potassium salts are commercially most readily available.

While any of the alkali metal molecularly dehydrated phosphates may be employed, for commercial reasons I prefer to employ one of the following in the indicated percentage, which percentage is based upon the dicalcium phosphate dihydrate present in the mixture:

| | Per cent |
|---|---|
| Anhydrous tetrasodium pyrophosphate | 1 to 5 |
| Anhydrous sodium acid pyrophosphate | 1 to 5 |
| Anhydrous tetrapotassium pyrophosphate | 1 to 5 |
| Sodium metaphosphate, insoluble form | 1 to 5 |

The quantities of the above materials indicated above are those which give a desirable stability in the phosphate mixtures, however lesser or greater quantities may be employed if desired. I have also found that combinations of the above salts form satisfactory stabilizers.

The dicalcium phosphate dihydrate may also be stabilized during its manufacture. When this is desirable, the dihydrate compound is precipitated in water solution by the mixing of lime slurry and phosphoric acid solution, the precipitation being carried out at about 40° C. to 45° C. To the mother liquor carrying the dicalcium phosphate in suspension is added a small quantity of tetrasodium pyrophosphate $Na_4P_2O_7$, the quantity added being from ½% to 1¼% by weight of the contained $CaHPO_4.2H_2O$. The pH of the mother liquor should be maintained in the neighborhood of 7.2 to 7.4 by the addition of more $Na_4P_2O_7$ if necessary. The temperature of the solution is maintained at from 65° C. to 75° C. The clear mother liquor is drawn off, the precipitate washed with water by decantation and again slurried with water and finally recovered by filtration. After drying of the precipitate the product may be ground to a suitable fineness.

Prepared in this manner the precipitated dicalcium phosphate will be found to contain a small amount of sodium and also pyrophosphate, these substances not necessarily being present in the precipitate in the quantity nor in the proportion in which they are added. These ions are probably adsorbed upon the surface of the phosphate particle in a selective manner. In general, however, depending upon the amount of $Na_4P_2O_7$ added, the dicalcium phosphate will contain from 0.35% to 0.52% of Na and from 0.50% to 2.0% of $P_2O_7$ ion.

I may also apply the stabilizer by mixing it with a slurry of dicalcium phosphate dihydrate and then spray drying. In this way the stabilizing agent is intimately incorporated in the spray dried agglomerates.

The stabilizing materials above enumerated are not poisonous or toxic and hence may be compounded without danger to produce a suitable food product.

In the past it had been thought that the cause of the unstability of hydrated dicalcium phosphate resided in the unavoidable presence therein of small amounts of monocalcium phosphate. Accordingly the remedy proposed was the neutralization of the acid monocalcium salt by basic materials.

I have found that neutralization of the monocalcium phosphate is not necessary, and in the compositions I have employed the anions have a greater effect than the cations in stabilizing the dicalcium phosphate dihydrate salt.

This application is a continuation-in-part of my application Serial No. 345,650, filed July 15, 1940.

What I claim is:

1. A mineral supplement adapted to supply calcium and phosphorus to the diet, said supplement comprising a mixture of 15 parts to 40 parts of monocalcium orthophosphate and 85 parts to 60 parts of dicalcium phosphate dihydrate, said mixture also including a small amount of a molecularly dehydrated alkali metal phosphate as an anti-caking agent.

2. The supplement defined in claim 1, in which the anti-caking agent is an alkali metal pyrophosphate.

3. The supplement defined in claim 1 in which the anti-caking agent is tetrasodium pyrophasphate.

4. The supplement defined in claim 1 in which the anti-caking agent is sodium acid pyrophosphate.

5. A mineral supplement adapted to supply calcium and phosphorus to the diet, said supplement comprising a mixture of 15 parts to 40 parts of monocalcium orthophosphate and 85 parts to 60 parts of dicalcium phosphate dihydrate, said mixture also including sodium metaphosphate as an anti-caking agent.

6. The supplement defined in claim 1, in which the anti-caking agent is the insoluble form of sodium metaphosphate.

7. The process for producing a dry powdery mineral supplement comprising monocalcium orthophosphate and dicalcium orthophosphate dihydrate, which comprises preparing a mixture of dicalcium orthophosphate dihydrate containing a small amount of a molecularly dehydrated alkali metal phosphate and adding the mixture to monocalcium orthophosphate to produce said supplement.

8. The process defined in claim 7 in which the dicalcium phosphate dihydrate is mixed with up to 5% of sodium acid pyrophosphate, and the resulting mixture is then mixed with monocalcium orthophosphate.

9. The process for producing a dry powdery mineral supplement comprising monocalcium orthophosphate and dicalcium orthophosphate dihydrate, which comprises treating dicalcium orthophosphate dihydrate with an aqueous solution of sodium acid pyrophosphate, drying said dicalcium orthophosphate, and mixing said dried orthophosphate with monocalcium orthophosphate.

10. A mineral supplement adapted to supply calcium and phosphorus to the diet, said supplement comprising a mixture of monocalcium orthophosphate and dicalcium phosphate dihydrate, said mixture also including a small amount of a molecularly dehydrated alkali metal phosphate.

11. A free flowing non-caking mixture comprising dicalcium orthophosphate dihydrate and a small amount of a molecularly dehydrated alkali metal phosphate having an alkali metal oxide/$P_2O_5$ molecular ratio substantially in the range of 1 to 2.

12. A free flowing non-caking mixture comprising monocalcium orthophosphate, dicalcium orthophosphate dihydrate and a small amount of a molecularly dehydrated alkali metal phosphate having an alkali metal oxide/$P_2O_5$ molecular ratio substantially in the range of 1 to 2.

13. A free flowing non-caking mixture comprising monocalcium orthophosphate, dicalcium orthophosphate dihydrate and a small proportion of a single molecularly dehydrated alkali metal phosphate.

14. A free flowing non-caking mixture comprising monocalcium orthophosphate, dicalcium orthophosphate dihydrate and a small amount of an alkali metal pyrophosphate.

15. A free flowing non-caking mixture comprising monocalcium orthophosphate, dicalcium orthophosphate dihydrate and a small proportion of anhydrous tetrasodium pyrophosphate.

16. A free flowing non-caking mixture comprising monocalcium orthophosphate, dicalcium orthophosphate dihydrate and a small proportion of an anhydrous sodium acid pyrophosphate.

17. A free flowing non-caking mixture comprising monocalcium orthophosphate, dicalcium orthophosphate dihydrate and a small proportion of insoluble sodium metaphosphate.

18. A process for minimizing lumping of finely divided dicalcium phosphate dihydrate upon storage which comprises adding to said dihydrate a small proportion of a molecularly dehydrated alkali metal phosphate having an alkali metal oxide/$P_2O_5$ molecular ratio substantially in the range of 1 to 2.

THEODORE W. SCHILB.

---

CERTIFICATE OF CORRECTION.

Patent No. 2,365,438.  December 19, 1944.

THEODORE W. SCHILB.

It is hereby certified that error appears in the printed specification of the above numbered patent requiring correction as follows: Page 2, second column, line 4, for "drying or" read --drying of--; line 55-56, claim 3, for "pyrophasphate" read --pyrophosphate--; and that the said Letters Patent should be read with this correction therein that the same may conform to the record of the case in the Patent Office.

Signed and sealed this 27th day of March, A. D. 1945.

Leslie Frazer (Seal)  Acting Commissioner of Patents.